United States Patent
Spörl et al.

(10) Patent No.: US 7,075,293 B2
(45) Date of Patent: Jul. 11, 2006

(54) METHOD FOR INDUCTIVE DISTANCE MEASUREMENT, AND A WORKING HEAD FOR CARRYING OUT THIS METHOD USING AN INDUCTION COIL

(75) Inventors: Georg Spörl, Rheinstetten (DE); Jürgen Walz, Baden Baden (DE)

(73) Assignee: Precitec GmbH, Gaggenau-Bad Rotenfels (DE)

( * ) Notice: Subject to any disclaimer, the term of this patent is extended or adjusted under 35 U.S.C. 154(b) by 71 days.

(21) Appl. No.: 10/351,514

(22) Filed: Jan. 27, 2003

(65) Prior Publication Data
US 2003/0107370 A1  Jun. 12, 2003

Related U.S. Application Data

(63) Continuation of application No. 09/524,535, filed on Mar. 13, 2000, now Pat. No. 6,534,973.

(30) Foreign Application Priority Data
Mar. 17, 1999 (DE) ................. 199 11 958

(51) Int. Cl.
*G01B 7/14* (2006.01)
(52) U.S. Cl. .............. 324/207.26; 324/207.16; 324/239
(58) Field of Classification Search ........ 324/204, 324/207.14, 207.15, 207.16, 207.17, 207.26, 324/228, 234, 236, 239; 331/117 R, 65; 340/686.6
See application file for complete search history.

(56) References Cited

U.S. PATENT DOCUMENTS

| | | | |
|---|---|---|---|
| 3,996,510 A * | 12/1976 | Guichard | 327/510 |
| 4,001,718 A | 1/1977 | Wilson et al. | |
| 4,004,216 A | 1/1977 | Natens et al. | |
| 4,012,690 A * | 3/1977 | Heytow | 324/243 |
| 4,646,011 A * | 2/1987 | Wallrafen | 324/207.25 |
| 4,991,301 A * | 2/1991 | Hore | 33/366.25 |
| 5,498,958 A | 3/1996 | Tu et al. | |
| 5,811,664 A * | 9/1998 | Whittington et al. | 73/53.07 |

FOREIGN PATENT DOCUMENTS

| | | |
|---|---|---|
| DE | 4212652 C2 | 10/1993 |
| DE | G9412765.4 | 11/1994 |

* cited by examiner

*Primary Examiner*—Jay M. Patidar
(74) *Attorney, Agent, or Firm*—Birch,Stewart,Kolasch & Birch,LLP

(57) ABSTRACT

An inductive measurement is carried out of the distance between a workpiece (3) and a working head (1), which bears an induction coil (8), through which an alternating current flows and which is part of a resonance circuit whose oscillation frequency is monitored for changes which occur as a consequence of changes in the distance between the workpiece (3) and working head (1). In this case, the working head (1) acts on the workpiece (3) with a material (2) having a dielectric constant greater than 1. The frequency of the alternating current is in the megahertz region or just therebelow. Last but not least, the induction coil is screened from external electric fields in order to avoid the influence of parasitic capacitances.

3 Claims, 1 Drawing Sheet

METHOD FOR INDUCTIVE DISTANCE MEASUREMENT, AND A WORKING HEAD FOR CARRYING OUT THIS METHOD USING AN INDUCTION COIL

This application is a continuation of application Ser. No. 09/524,535, filed on Mar. 13, 2000, now U.S. Pat. No. 6,534,973, the entire contents of which are hereby incorporated by reference and for which priority is claimed under 35 U.S.C. § 120; and this application claims priority of application Ser. No. 199 11 958.9 filed in Germany on Mar. 17, 1999 under 35 U.S.C. § 119.

FIELD OF INVENTION

The invention relates to a method for inductive distance measurement.

DESCRIPTION OF THE BACKGROUND ART

Method for inductive measurement of a distance between a workpiece and a working head are already generally known. The working head in this case bears an induction coil, through which an alternating current flows and which is part of a resonance circuit whose oscillation frequency is monitored for changes which occur as a consequence of changes in the distance between the workpiece and working head.

Moreover, working heads for workpiece machining are also generally known which have an outlet channel which faces the workpiece and is surrounded concentrically by an induction coil, in order to determine the distance between the workpiece and working head inductively with the aid of the coil.

SUMMARY OF THE INVENTION

It is the object of the invention to develop a further field of application for the method mentioned above. Likewise, a further working head suitable for carrying out this method is to be made available.

A method according to the invention for inductive measurement of a distance between a workpiece and a working head which bears an induction coil through which an alternating current flows and which is part of a resonance circuit whose oscillation frequency is monitored for changes which occur as a consequence of changes in the distance between the workpiece and working head is distinguished in that the working head acts on the workpiece with a material having a dielectric constant greater than 1; the frequency of the alternating current is in the megahertz region or just therebelow; and the induction coil is screened from external electric fields.

By contrast, a working head for machining a workpiece which has an outlet channel facing the workpiece and which is surrounded concentrically by an induction coil is distinguished in that a material with a dielectric constant greater than 1 can be guided through the outlet channel, and the induction coil bears an electrical screen.

It is possible with the aid of the invention to determine the distance between the working head and the workpiece exactly in an inductive way even when the workpiece is acted on by the working head with a medium whose dielectric constant $\epsilon$ is greater than or very much greater than 1. For example, the medium acting on the workpiece can be water, that is to say a water jet with or without abrasive material, or a flowable adhesive which is to be applied to the surface of the workpiece.

In this case, the method and working head must be capable of carrying out the respective process steps even in very narrow spaces of, for example, three-dimensional workpieces, with the result that as compact an arrangement as possible is desired. Consequently, the aim is to select the frequency of the alternating current flowing through the induction coil to be relatively high, and this favors selection, in particular, of relatively small electric components. On the other hand, however, because of the relatively high dielectric constant of the material to be processed, in the case of high frequencies relatively high parasitic capacitances occur which can falsify the distance measurements. Consequently, according to the invention it is also proposed to screen the induction coil from external electric fields in order to avoid the influence of parasitic capacitances.

Because of the selected and relatively high frequency of the alternating current flowing through the induction coil, the depth of penetration of the current induced in the workpiece is only slight, with the result that the method operates essentially independently of the thickness of the workpiece. Moreover, there is the further advantage that the method is also largely independent of the type of material of the workpiece to be machined.

In a refinement of the invention, the frequency of the alternating current can be in the region from approximately 500 kHz to approximately 20 MHz, preferably in the region from three to eleven MHz.

For the purpose of electrical screening of the induction coil, the latter can, for example, be screened by a screening conductor, but also by an electrical screen which is such as to surround on the outside a coil packet formed by the induction coil. The screening can thus be toroidal or in the shape of an annular box. Here, in the case of a metallic working head the electric screening of the coil packet can also be completed by that wall region on which the coil packet is seated.

In a still further refinement of the invention, an LC resonance circuit containing the induction coil is arranged on the induction coil or in the vicinity thereof on the working head, and this improves the measurement results, since in this case external influences, for example temperature fluctuations, act in the same way on all parts of the resonance circuit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

An exemplary embodiment of the invention is described below in detail with reference to the drawings which are given by way of illustration only, and thus are not limitative of the present invention, and in which.

DETAILED DESCRIPTION OF THE PREFERRED EMBODIMENTS

Figure 1:
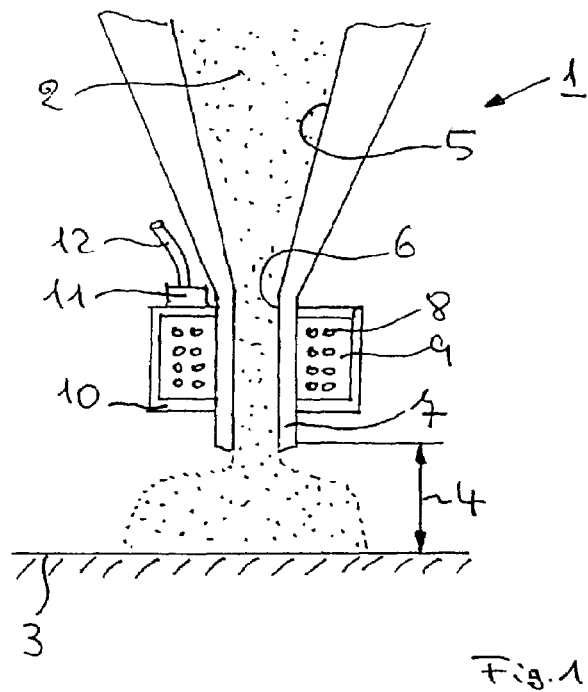
FIG. 1 shows a working head, constructed as a nozzle, in longitudinal section with an inductive distance meter.

The working head according to the invention in accordance with FIG. 1 is constructed, for example, in the form of an application nozzle 1. It can, for example, consist of metal or another suitable material, and is suitable for dispensing flowable material 2 in the direction of a workpiece 3 to be machined. For this purpose, the application nozzle 1 must be kept at a constant distance 4 relative to the workpiece 3, and this requires distance control when the application nozzle 1 is moved parallel to the workpiece 3.

The application nozzle 1 has an inner channel 5 which tapers conically towards the nozzle tip and merges there into a cylindrical channel 6 with a constant inside diameter. Seated concentrically with the inner channel 5 on the outside of a channel wall 7 surrounding the cylindrical channel 6 is an induction coil 8 which has a plurality of turns. This induction coil 8 is fastened on the application nozzle 1 and constructed in the form of a coil packet 9 which has an annular structure with a rectangular cross section. For this purpose, the turns of the induction coil 8 can be permanently encapsulated in a suitable material.

The coil packet 9 is surrounded above, below and on the outside by a metal plate 10 and screened thereby from external electric fields. On the inside, the coil packet 9 is screened by the channel wall 7 from external electric fields, since like the entire application nozzle 1 as well, the channel wall 7 can also consist of metal. It is therefore possible to apply earth potential or screen potential for screening purposes to the metal plate 10 via the application nozzle 1 consisting of metal.

Figure 2:
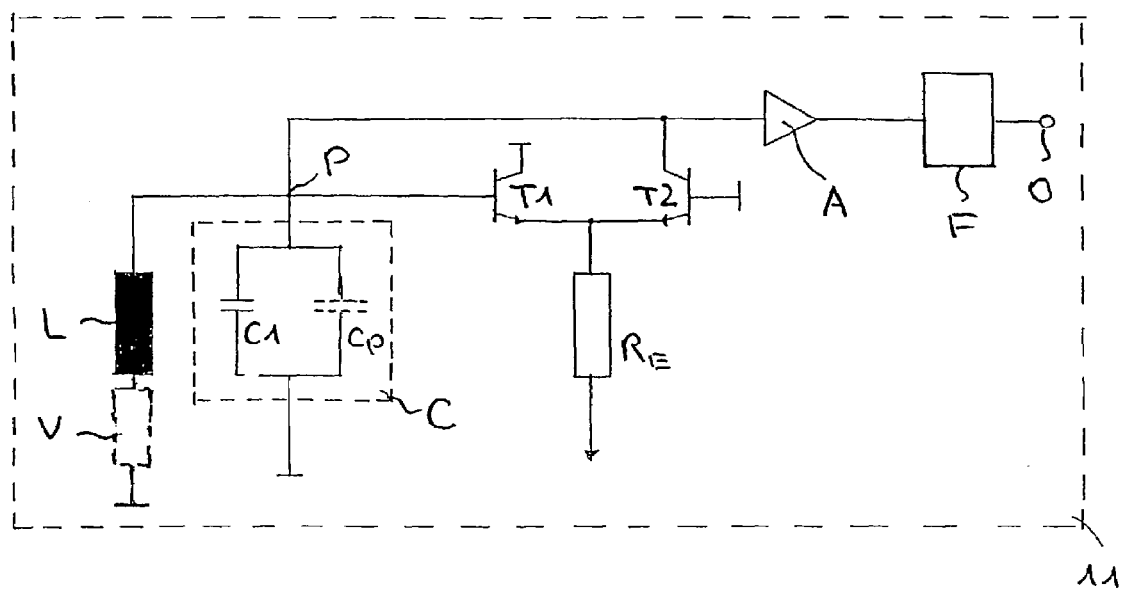
FIG. 2 shows a circuit diagram of the inductive distance meter according to FIG. 1.

An evaluation circuit 11, which is explained in more detail below with reference to FIG. 2, is located on the top side of the metal plate 10 in a fashion insulated therefrom. This evaluation circuit 11 is connected via a cable 12 to a control device (not represented), in order to control the distance 4 of the application nozzle 1 from the workpiece 3 in a constant fashion, depending on the result of the evaluation circuit 11. The control device controls a mechanical drive, which is connected to the application nozzle 1 and is likewise not represented, for the purpose of displacing the application nozzle 1 perpendicular to the workpiece 3 as a function of the output of the evaluation circuit 11. A further drive can be used to move the application nozzle 1 and workpiece 3 relative to one another in the horizontal direction of the workpiece 3 or the surface thereof.

FIG. 2 shows the evaluation circuit 11 in further detail.

This evaluation circuit 11 includes an LC resonance circuit whose frequency is virtually dependent only on the capacitance C, which is constant owing to the screen 10, and on the inductor L of the induction coil 8, which depends on the distance.

The LC resonance circuit includes, in detail, a transistor T1 whose collector terminal is connected to a frame, and whose base terminal is coupled to the inductor L or the induction coil 8 and to the capacitance C at a common connecting point P. The respective other terminals of the inductor L and the capacitance C are connected to a frame, on the one hand via a loss resistance V, and on the other hand directly. The capacitance C comprises a permanently described capacitor C1 in the form of a separate component, and the parasitic capacitance Cp of the induction coil 8, which is connected in parallel to the capacitor C1. Since the induction coil 8 is screened by the metal plate 10, this parasitic capacitance Cp is likewise constant like the permanently prescribed capacitor C1. The frequency of the resonance circuit thus depends only on the inductor L, which varies depending on the distance 4 between the application nozzle 1 and workpiece 3. The loss resistance V connected in series to the inductor L exerts no influence on the frequency of the resonance circuit and has the effect only of changing the amplitude of the RF oscillation. However, the latter is not evaluated.

The LC resonance circuit further includes a second transistor T2, whose base terminal is connected to a frame and whose collector terminal is connected to the common connecting point P. The emitter terminals of the two transistors T1 and T2 are connected directly to one another, a resistor $R_E$ being coupled respectively via a common connecting point to the emitter terminals of T1 and T2. The other terminal of the resistor $R_E$ is connected to negative potential. The collector of the transistor T2 and the connecting point P are, moreover, fed to an input of an amplifier A whose output is connected to the input of a frequency measuring device F. Thus, there respectively appears at the output O of the frequency measuring device F a frequency which is assigned to a distance 4 between the application nozzle 1 and workpiece 3 and can be regarded as the actual value and be controlled to the desired value, for example to be constant.

The LC resonance circuit shown in FIG. 2 is implemented as a differential amplifier. Since the base potential of T1 is in phase with the collector potential of T2, the positive feedback can be produced by direct connection. The loop gain is proportional to the transconductance of the transistors. It can be set within wide limits by changing the emitter current.

In order to render the control loop dynamics independent of the distance 4 between the application nozzle 1 and workpiece 3, it would also be possible to linearize the output values supplied by the frequency meter F.

In the case of an operating frequency of 10 MHz, for example, the circuit shown in FIG. 2 supplies distance-dependent frequency changes in the kHz region, resulting in a good resolution.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A working head for machining a workpiece comprising an outlet channel facing the workpiece, the outlet channel being surrounded concentrically by an induction coil, a material with a dielectric constant (e)>1 being guidable through the outlet channel therethrough and being surrounded concentrically by an induction coil, the induction coil bearing an electrical screen that surrounds a coil packet formed by the induction coil above, below, on the outside and on the inside, for screening the induction coil from external electric fields;

wherein the outlet channel is bounded by a metallic wall which is part of the electrical screen of the coil packet.

2. The working head according to claim 1, further comprising an LC resonance circuit included in an evaluation circuit that is located on the top side of the induction coil or in the vicinity thereof.

3. A system for machining a workpiece comprising a working head and a supply of material to be applied to the workpiece, the working head having an outlet channel facing the workpiece, the outlet channel being surrounded concentrically by an induction coil, the material having a dielectric constant (e)>1, the material being guidable through the outlet channel, the induction coil having an electrical screen which surrounds a coil packet formed by the induction coil, for screening the induction coil from external electric fields; wherein the outlet channel is bounded by a metallic wall which is part of the electrical screen of the coil packet.

* * * * *